(12) United States Patent
Anand Pushkala et al.

(10) Patent No.: US 12,114,185 B2
(45) Date of Patent: Oct. 8, 2024

(54) METHOD AND SYSTEM TO PREDICT NETWORK PERFORMANCE OF A FIXED WIRELESS NETWORK

(71) Applicant: Telefonaktiebolaget LM Ericsson (publ), Stockholm (SE)

(72) Inventors: Sri Harsha Anand Pushkala, Frisco, TX (US); Vinod Kumar Jammula, Plano, TX (US); Ankita Chowdhury, The Colony, TX (US); David Reboredo, Frisco, TX (US); Amr Shehata, Frisco, TX (US)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 408 days.

(21) Appl. No.: 17/299,759

(22) PCT Filed: Dec. 11, 2018

(86) PCT No.: PCT/IB2018/059849
§ 371 (c)(1),
(2) Date: Jun. 3, 2021

(87) PCT Pub. No.: WO2020/121020
PCT Pub. Date: Jun. 18, 2020

(65) Prior Publication Data
US 2022/0022066 A1      Jan. 20, 2022

(51) Int. Cl.
*H04L 41/147* (2022.01)
*H04L 41/14* (2022.01)
*H04W 24/08* (2009.01)

(52) U.S. Cl.
CPC ........... *H04W 24/08* (2013.01); *H04L 41/145* (2013.01); *H04L 41/147* (2013.01)

(58) Field of Classification Search
CPC ..... H04W 24/08; H04L 41/145; H04L 41/147
See application file for complete search history.

(56) References Cited

U.S. PATENT DOCUMENTS

| | | | |
|---|---|---|---|
| 2015/0139074 A1* | 5/2015 | Bane | H04L 41/5009 370/328 |
| 2018/0054452 A1 | 2/2018 | Muddu et al. | |
| 2019/0364532 A1* | 11/2019 | Jain | H04W 16/22 |

FOREIGN PATENT DOCUMENTS

WO      2018/103524 A1      6/2018

OTHER PUBLICATIONS

Cloudify, "What is ONAP and what does it mean for you?", Available Online at <https://cloudify.co/onap/what-is-onap/>, May 27, 2018, 6 pages.

(Continued)

*Primary Examiner* — Amal S Zenati
(74) *Attorney, Agent, or Firm* — Weisberg I.P. Law, P.A.

(57) ABSTRACT

Methods and systems to predict network performance of a fixed wireless network is disclosed. In one embodiment, a method is performed by an electronic device, the method comprises receiving data of a fixed wireless network; modeling the data using a plurality of functions, where the modeling comprises identifying a prediction function that provides a best approximation of the data based on a user preference of approximation speed and accuracy; predicting a network performance value in a future time using the prediction function; and notifying when the predicted network performance value fails to meet a threshold value.

15 Claims, 12 Drawing Sheets

(56) References Cited

OTHER PUBLICATIONS

Koo et al., "Short-Term Electric Load Forecasting Using Data Mining Technique", IEEE Proceedings of 7th International Conference on Intelligent Systems and Control (ISCO 2013), Jan. 4, 2013, pp. 153-157.

Maravedis, "5G Fixed Wireless Gigabit Services Today: An Industry Overview", Available Online at <https://go.siklu.com/hubfs/Content/White%20Papers/Maravedis%20Industry%20Overview:%205G%20Fixed%20Wireless%20Gigabit%20Services%20Today.pdf?t=1508833127116>, Nov. 2017, pp. 1-32.

Shin et al., "Multiple Regression Models for a Big Data Empowered SON Framework", IEEE Proceedings 7th International Conference on Ubiquitous and Future Networks (ICUFN 2015), 2015, pp. 982-984.

Trubetskoy, Gregory, "Hot-Winters Forecasting for Dummies (or Developers)—Part 1", Available Online at <https://grisha.org/blog/2016/01/29/triple-exponential-smoothing-forecasting/>, Jan. 29, 2016, 9 pages.

* cited by examiner

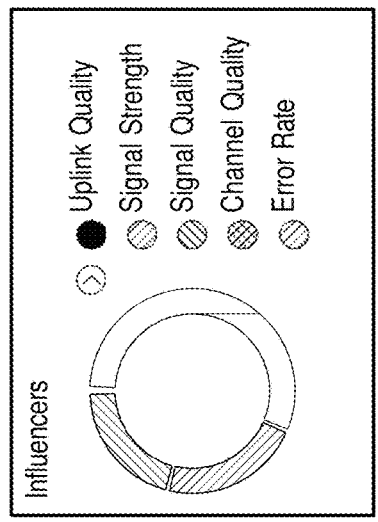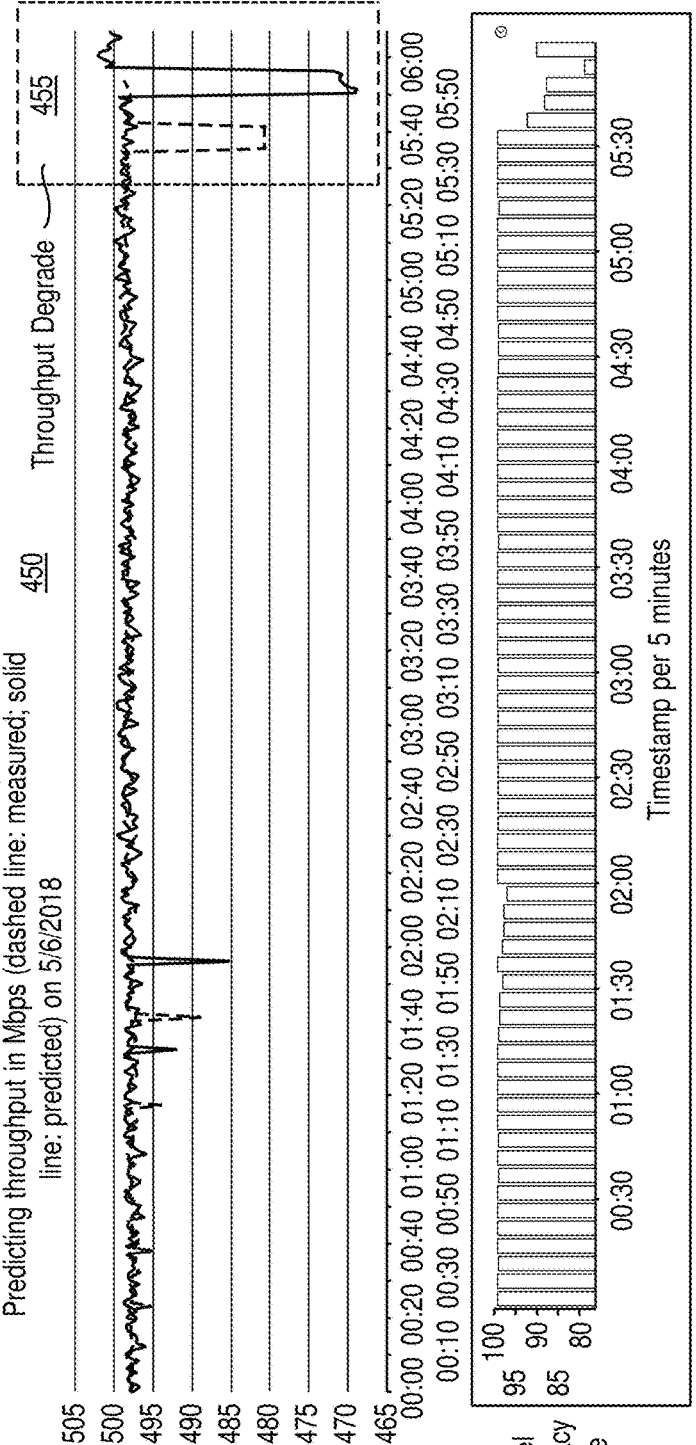
FIG. 4A
FIG. 4B

METHOD AND SYSTEM TO PREDICT NETWORK PERFORMANCE OF A FIXED WIRELESS NETWORK

CROSS-REFERENCE TO RELATED APPLICATIONS

This application is a National stage of International Application No. PCT/IB2018/059849, filed Dec. 11, 2018, which is hereby incorporated by reference.

TECHNICAL FIELD

Embodiments of the present disclosure relate to the field of networking, and more specifically, relate to methods and systems to predict network performance of a fixed wireless network.

BACKGROUND ART

There is an increasing demand for access bandwidth that is being fueled by high utilization applications such as those associated with the Internet. The fixed wireless access (FWA) technology can provide gigabit broadband service in unlicensed and licensed spectrums; and using FWA to build fixed wireless networks thus becomes an ideal option for both small and large internet service providers (ISPs). Yet the cost of deploying large dense networks of FWA (e.g. the fifth generation (5G) FWA) is substantial. Additionally, maintaining a fixed wireless network can be costly as network performance may deteriorate due to different external factors like loss in throughput due to loss of line of sight, weather conditions and so on. It is desirable to be able to predict network performance so that an operator/agent of the fixed wireless network may take preventive/remedial measures prior to an anticipated network performance degradation. While a variety of prediction functions/models have been proposed, each prediction approach has its own advantages and drawbacks, and it is desirable to determine the proper prediction approach for a fixed wireless network dynamically during run time.

Furthermore, a fixed wireless network requires an efficient/flexible platform for deploying/maintaining the fixed wireless network. Operators/agents of a fixed wireless network often use services of the platform in the field and outside of the premises of data centers. For example, an engineer may need to figure out the appropriate location for a customer premise equipment (CPE) to obtain the best network performance for a subscriber at the location of the CPE deployment. A drone-bot may need to zip across a city to get real-time inputs from the fixed wireless network at various locations. It is desirable to have light-weight, user-friendly user interfaces for users to enter their preference and to review existing and predicted network performance on the go, while offloading the bulk of the tasks for deploying/maintaining of the fixed wireless network to the backend of the platform.

SUMMARY

Embodiments of the invention offer efficient ways to predict network performance of a fixed wireless network. In one embodiment, a method is performed by an electronic device, the method comprises receiving data of a fixed wireless network; modeling the data using a plurality of functions, where the modeling comprises identifying a prediction function that provides a best approximation of the data based on a user preference of approximation speed and accuracy; predicting a network performance value in a future time using the prediction function; and notifying when the predicted network performance value fails to meet a threshold value.

Embodiments of the invention include electronic devices to predict network performance of a fixed wireless network. In one embodiment, an electronic device comprises a processor and computer-readable storage medium that provides instructions that, when executed by the processor, cause the electronic device to perform operations, including: receiving data of a fixed wireless network; modeling the data using a plurality of functions, where the modeling comprises identifying a prediction function that provides a best approximation of the data based on a user preference of approximation speed and accuracy; predicting a network performance value in a future time using the prediction function; and notifying when the predicted network performance value fails to meet a threshold value.

Embodiments of the invention include computer-readable storage media that provide instructions (e.g., computer program) that, when executed by a processor of an electronic device, cause the electronic device to perform operations comprising one or more methods of the embodiments of the invention.

Through embodiments of the invention, an operator/agent of a fixed wireless network may dynamically select the best model to predict the network performance of the fixed wireless network based on their preference. The operator/agent may adjust their preference and monitor the network performance of the fixed wireless network using a light-weight, user-friendly user interface, while the bulk of the tasks for deploying/maintaining of the fixed wireless network is performed at the backend (e.g., using cloud computing).

BRIEF DESCRIPTION OF THE DRAWINGS

The invention may best be understood by referring to the following description and accompanying drawings that illustrate embodiments of the invention.

FIG. 4A shows the multi-variate selection for network performance prediction per one embodiment of the invention.

FIG. 4B shows a network performance prediction per one embodiment of the invention.

DETAILED DESCRIPTION

Figure 1:
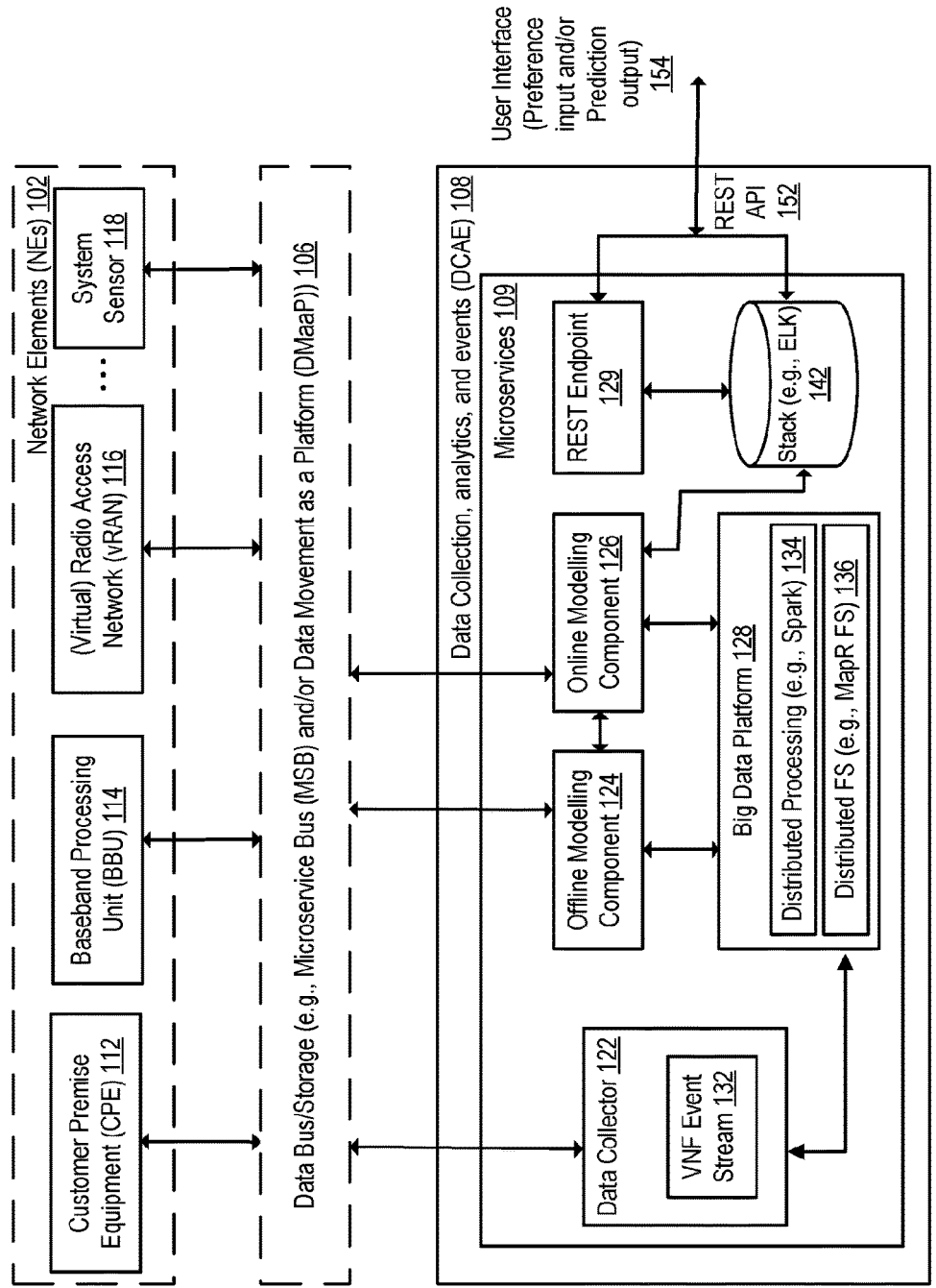
FIG. 1 shows a management platform architecture of a fixed wireless network per one embodiment.

The following description describes methods, apparatus, and computer programs to prevent micro-loops during a network topology change. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits, and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN)

adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A wireless communication network (or "wireless network," and the two terms are used interchangeably) is a network of electronic devices communicating using radio waves (electromagnetic waves within the frequencies 30 KHz-300 GHz). The wireless communications may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the invention, the invention may apply to other wireless communication networks, including LTE operating in unlicensed spectrums, Multefire system, IEEE 802.11 systems.

A network device (ND) (also referred to as a network node or node, and these terms are used interchangeably in this disclosure) is an electronic device in a wireless communication network via which a terminal device accesses the network and receives services therefrom. One type of network devices may refer to a base station (BS) or an access point (AP), for example, a node B (NodeB or NB), an evolved NodeB (eNodeB or eNB), a next generation node B (gNB), a remote radio unit (RRU), a radio header (RH), a remote radio head (RRH), a relay, and a low power node such as a femtocell and a picocell.

A terminal device may access a wireless communication network and receive services from the wireless communication network through a network device. A terminal device may also be referred to as a wireless device (WD), and the two terms are used interchangeably in this disclosure. A terminal device may be a user equipment (UE), which may be a subscriber station (SS), a portable subscriber Station, a mobile station (MS), an access terminal (AT), or other end user devices. An end user device (also referred to as end device, and the two terms are used interchangeably) may be one of a mobile phone, a cellular phone, a smart phone, a tablet, a wearable device, a personal digital assistant (PDA), a portable computer, an image capture terminal device (e.g., a digital camera), a gaming terminal device, a music storage and playback appliance, a smart appliance, a vehicle-mounted wireless terminal device, a smart speaker, and an Internet of Things (IoT) device. Terminal devices may be coupled (e.g., through customer premise equipment coupled to an access network (wired or wirelessly)) to edge NDs, which are coupled (e.g., through one or more core NDs) to other edge NDs, which are coupled to electronic devices acting as servers.

A fixed wireless network is a wireless network that provides wireless access between two or more fixed locations. The signal transmissions in a fixed wireless network occur through the air over a terrestrial microwave platform, and they may be a cheaper alternative to the signal transmissions through copper or optical fiber. A fixed wireless network may operate in a point-to-point (PtP) topology, where a network device or other network node communicates with a single other node; or the fixed wireless network may operate in a point-to-multi-points (PtMP) topology, where a network device communicates with multiple other nodes. While 5G based fixed wireless network and its components are used as examples in this disclosure, embodiments of the invention apply to other fixed wireless networks as well.

A service provider, an operator, or an agent is in charge of deploying and maintaining a fixed wireless network. The service provider, operator or agent monitors the prediction of network performance and provides remedial measurements when necessary. The operator may monitor the network from a central location while the agent may be at the premises where network devices of the fixed wireless network are deployed (e.g., at the customer location). For simplicity of expression, this disclosure assumes that all of the service provider, operator and agent manage a fixed wireless network anywhere necessary and uses only the operator as the example of the management entity of the fixed wireless network.

Open network automation platform (ONAP) is an initiative created by the combination of the ECOMP (Enhanced Control, Orchestration, Management & Policy) and Open-O (Open Orchestrator). ONAP aims at bringing the capabilities for designing, creating, orchestrating and handling of the full lifecycle management of virtual network functions (VNFs), software defined networks (SDNs), and the services provided through the VNFs and SDNs. Thus, ONAP provides a platform for real-time, policy-driven orchestration and automation of physical and virtual network functions that will enable software, network, IT and cloud providers and developers to rapidly automate new services and support complete lifecycle management.

Management Platform Architecture of a Fixed Wireless Network

FIG. 1 shows a management platform architecture of a fixed wireless network per one embodiment. The management platform architecture 100 may be implemented using ONAP and/or another platform that modulates feature implementation. The architecture 100 collects data from network elements 102, makes the data available to a data bus/storage 106, and then analyzes the data at data collection, analytics, and events (DCAE) 108 so that an operator of the fixed wireless network may predict network performance of the fixed wireless network.

Each one of the network elements 102 may be implemented in one or more electronic devices (e.g., network devices or terminal devices). For example, a network element is customer premise equipment (CPE) 112. The CPE 112 may be a residential gateway installed at a customer precise to provide internet or public switched telephone network (PSTN) services through the fixed wireless network. One network element is baseband processing unit (BBU) 114, which may also be referred to as a baseband processing circuitry (discussed in more details below). In one embodiment, the BBU 114 is a part of a radio base station that also includes one or more remote radio units (RRUs) (also referred to as remote radio heads (RRHs)).

A network element may be virtual, and it may be implemented as a virtual network function (VNF) or other services provided by a network device. A VNF may consist of one or more virtual machines running different software and processes, on top of standard high-volume servers, switches and storage devices, or even cloud computing infrastructure, instead of having custom hardware appliances for each network function. A virtual radio network (vRAN) 116 is an example of such a VNF, and it moves the controller functions of traditional network device (e.g., base stations) to servers at a central location or closer to the edge of the network.

A network element may also include system sensors 118 that measure physical operational environment of the fixed wireless network. The system sensors 118 may include ambient light sensors (to, e.g., measure ambient light intensity, ambient light spectrum, and ambient light intensity and spectrum) as the system performance of a fixed wireless network often depends on the line of sight. The system sensors 118 may include weather/environmental sensors to indicate the weather/environmental condition a fixed wireless network operates. The system sensors 118 may also include positioning sensors (e.g., global positioning system (GPS) sensors, global navigation satellite system (GLONASS) sensors, Galileo positioning system sensors, and/or NAVIC sensors) to indicate positions of network elements of the fixed wireless network. The system sensors 118 may further/alternatively include ultrasonic sensors, altitude sensors, and/or laser dopplers. A system sensor may be a part of another network element so that it collects relevant information about the network element during operations; and alternatively a system sensor may also be implemented in a network/terminal device that collects information about an area in which the fixed wireless network operates (e.g., a set of weather/environmental sensors may be placed strategically within a zip code area). Each one of the network elements 102 collects data that are generated while deploying and maintaining a fixed wireless network, and the details of the data are discussed in more details herein below relating to FIG. 3.

The collected data are made available to a data bus or a data storage at reference 106. The data bus/storage 106 may be a microservice bus (MSB) or a data movement as a platform (DMaaP) module. The MSB may provide key infrastructure functionalities to support microservices including service registration/discovery, service gateway, service load balancer. The DMaaP may transport and processes data from any source to any target with the format, quality, security, and concurrency required to serve the needs of a fixed wireless network customer.

The collected data are made available to DCAE 108, particularly to its data collector 122, which is a part of microservices 109 in one embodiment. The data collector 122 may obtain data in batch (e.g., obtaining historical data) or obtain the data in real-time as a stream of data flow, and the latter data may be gathered using a VNF event stream 132 in one embodiment. The microservices 109 structure may be an application as a collection of loosely coupled services. In a microservices architecture, services are fine-grained, and the protocols are lightweight (hence each service is referred to as a microservice). The benefit of decomposing an application into different smaller services is that it improves modularity. This makes the application easier to understand, develop, test, and become more resilient to architecture erosion. Microservices parallelize development by enabling small autonomous teams to develop, deploy and scale their respective services independently. Note that DCAE 108 is a subsystem of an ONAP system, yet embodiments of the invention are not limited to ONAP and other electronic devices may provide similar data collection, processing, and analysis used in embodiments of the invention.

The collected data may then be processed using a big data platform 128. The big data platform 128 may classify the data with respect to key operational and business objectives (OBOs) in which accessibility, retainability, integrity, mobility, and business intelligence are present. It may unify and/or diffuse multiple performance indicators (PIs) into more significant key performance indicators (KPIs). Additionally, it may rank the KPIs within each OBO with respect to their effect on that OBO; it may filter out KPIs that affect the OBO below a predefined threshold; it may find, for each KPI, the network performance that affects that KPI; it may order, for each KPI, the associated network performance with respect to the strength of their association; and it may determine, for each network performance, a vector that quantifies its association with each KPI. Not all data are processed through all the classification, unification/diffusion, ranking, filtering, relating, ordering, and cross-correlation, and the processing of the data depends on the relevancy level of the data to the interested network performance. The data processing may use tools such as distributed processing 134, which may use Apache Spark to process the data in a general-purpose cluster-computing system. The data processing may also use distributed file system (FS) 136 such as MapR file system (MapR FS) that supports both large scale and high performance uses.

The processed data are then provided to offline modelling component 124 and online modelling component 126. The offline modelling component 124 is distinguished from the online modelling component 126 in that the offline modelling component 124 may use cloud-based computing resources while the online modelling component 126 typically uses local computing resources (e.g., the computing resources within a data center that hosts the network performance prediction service). Using cloud-based computing resources enables significant more compute capacity to be brought to bear. The computing resources in the offline modelling component 124 allows the microservices 109 to offload the intensive computation in modelling to the cloud, which with the economies of scale can offer significant more computation power than an online modelling component that is often owned and/or operated by the operator of the fixed wireless network. The offline and online modelling components use models to predict network performance based on the processed data, and their respective tasks in the prediction are discussed in more details below. The result of the prediction is provided to stack 142. The stack 142 may be an ELK stack that includes elasticserach (a search and analytics engine), logstash (a server-side data processing pipeline that ingests data from multiple sources simultaneously, transforms it, and then sends it to a "stash" like Elasticsearch), and Kibana (a tool to let users visualize data with charts and graphs in Elasticsearch).

The data in the stack 142 may be represented by a REST endpoint 129. The REST endpoint 129 (or REpresentational State Transfer (REST) endpoint, endpoint, these terms are used interchangeably in this document) may take a number of parameters, perform a specific function, and return data to a user. The specific function may be an operation such as retrieving an application programming interface (API) index, updating a post, or deleting a comment.

The REST endpoint 129 is presented to an operator of the fixed wireless network through a REST API 152. The REST API 152 is a user interface that the operator may provide the operator's preference in making predication of network performance and review the prediction output as discussed in more details below.

Though the network devices and electronic devices shown in FIG. 1, the management platform architecture 100 provides a user preference-based system to predict network performance of a fixed wireless network, and the separation of the online and offline modelling components allows a dynamic selection of suitable models predict the network performance.

The management platform architecture additionally 100 use modular components for various logic (e g taking advantages of ONAP components), and the restful endpoints exposes user friendly interfaces (e.g., GUI) for user to set user preference and to monitor the network performance visually. The light-weight user interfaces mask the complexity of network performance prediction (using both online and offline computing resources) and make the network performance prediction platform efficient and flexible.

Data Flow to Predict Network Performance

Figure 2:
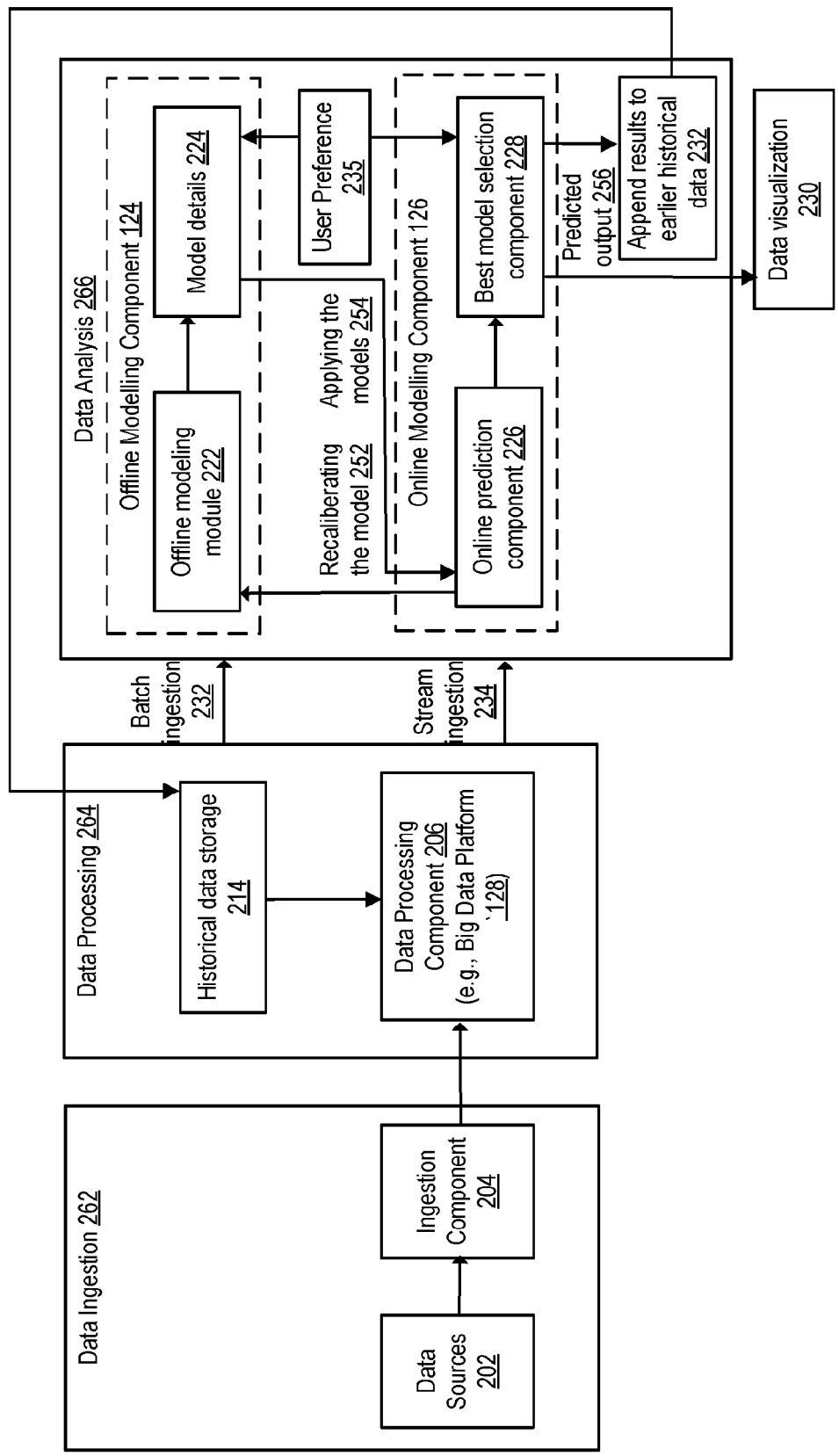
FIG. 2 shows the data flow to predict network performance of a fixed wireless network per one embodiment of the invention.

FIG. 2 shows the data flow to predict network performance of a fixed wireless network per one embodiment of the invention. The data collected in a fixed wireless network may be used to predict network performance through stages in data flow 200 per one embodiment of the invention. In one embodiment, the data flow utilizes the management platform architecture 100 shown in FIG. 1.

The initial stage for predicting network performance is a data ingestion stage 262. The data are collected from data sources 202, and the data are collected through an ingestion component 204. The data sources 202 include network elements 102 and the ingestion component 204 includes data collector 122 one embodiment.

The next stage for predicting network performance is data processing stage 264. The collected data are processed through a data processing component 206. The data processing at the data processing component 206 may take as input historical data from historical data storage 214 as well as the collected data from the data ingestion 262. In one embodiment, the data processing component 206 includes the big data platform 128 and it may classify, unify/diffuse, rank, filter, relate, order, and cross-correlate the input data as discussed herein above.

The processed data are then provided to the data analysis stage 266. The processed data may be provided as a batch ingestion 232, where the processed data are made available to the data analysis stage 266 one batch at a time. The batched data may be historical data from one geographic area (e.g., within a zip code) or from one period of time. The processed data may also be provided real time as a stream of data through a stream ingestion 234.

The data analysis stage 266 may take the ingested data to offline modeling module 222. A number of models may be applied to the ingested data through the model details 224. To get an accurate prediction, numerous models may be trained and updated for selecting the best model to predict the network performance Additionally, the training and updating of the numerous models may take user's preference, thus the model details 224, which finds the parameters for the models, has user preference 235 as an input. Training the numerous models based on the user's preference is often computationally expensive, thus it is desirable to use offline computing resources such as cloud computing to perform the computation. In one embodiment, the application of the numerous models is performed in the offline modelling component 124.

Then the models are applied to ingested data to predict the network performance online at reference 226. It is desirable to make the prediction real-time or near real-time. Online computing resources are close to the fixed wireless network (e.g., the online computing resources may be within a data center that hosts the network performance prediction service), thus the prediction is preferably performed by the online prediction component 226. From the prediction performed by the prediction models, the best model is selected by a best model selection component 228. The determination of the best model may be based on user preferences from the user preference 235. Note that the online prediction component 226 may provide feedback to the offline modeling module 222 as it applies the models to the ingested data, and the offline modeling module 222 may adjust its modeling in its future modeling.

The selected model identified by the best model selection component 228 is then used to predict the network performance, and the predicted output 256 is provided to data visualization 230, which presents the prediction in a user-friendly graphic user interface (e.g., through a REST API 152). Additionally, the predicted output 256 may also be appended to earlier historical data at reference 232. The data are then stored at the historical data storage 214.

Network Performance Prediction Using Machine Learning

Figure 3:
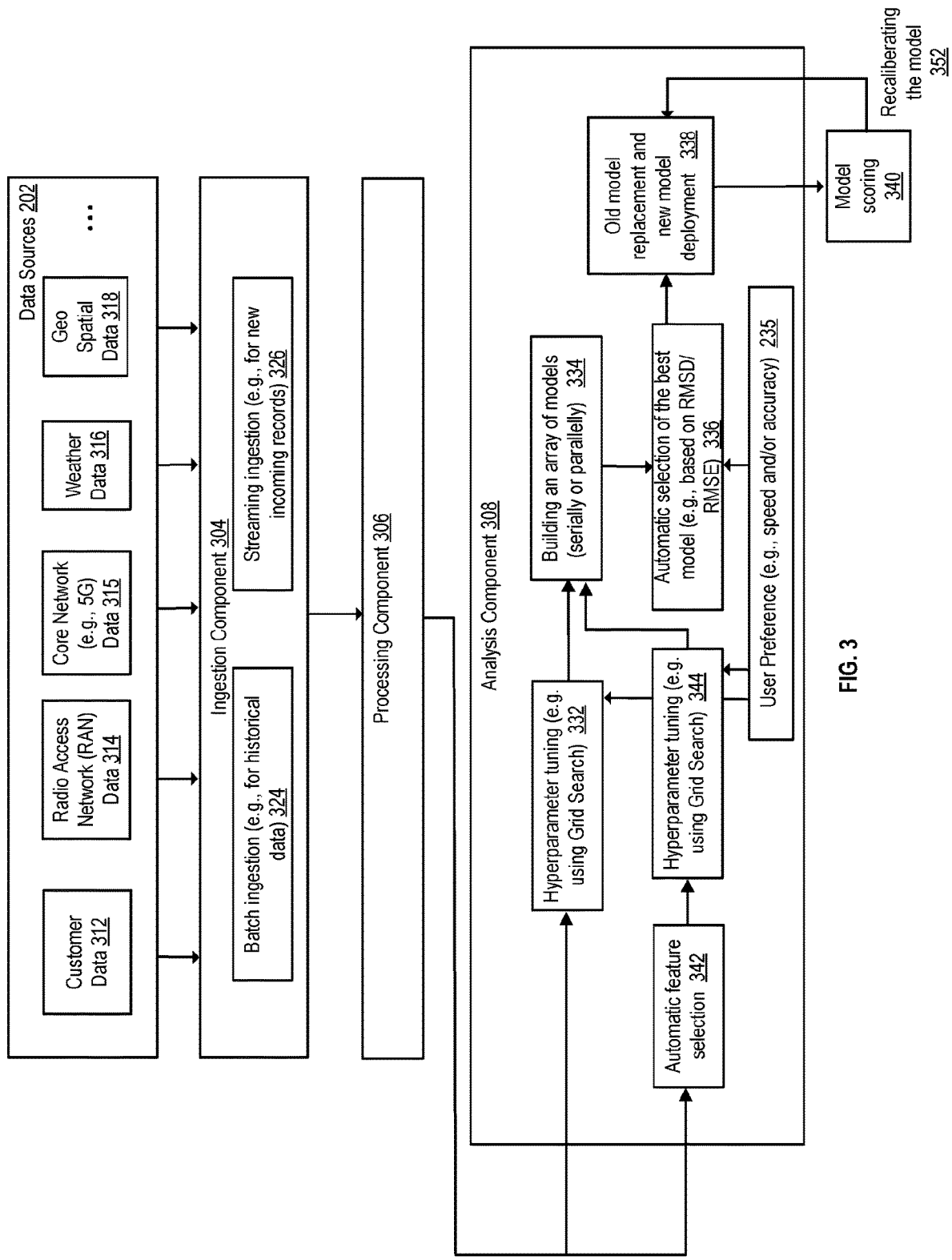
FIG. 3 shows network performance prediction using machine learning per one embodiment of the invention.

One advantage of the embodiments of the invention is that the network performance prediction may apply machine learning to the collected data in a fixed wireless network. FIG. 3 shows network performance prediction using machine learning per one embodiment of the invention. The network performance prediction may use the management platform architecture 100 and/or follow the data flow 200 discussed herein above.

The data are collected from data sources 202 discussed herein above. The data may include customer data 312 (e.g., collected by CPE 112) such as control data, contextual data, and voice data, which can be used to optimize, configure, and plan network operations, and also to support key business processes such as customer's experience and retention enhancement. Note that the terms of "customer," "client," and "subscriber" are used interchangeably to describe one that subscribes services of a fixed wireless network.

The data may also include radio access network data 314 (e.g., cell level data collected by BBU 114 and/or vRAN 116) such as radio condition data that are reported by a network device (e.g., a base station) and all terminal devices within the coverage of the network device (e.g., the radio condition data including reference signal received power levels, reference signal received quality values of the serving and adjacent cells). The cell level data may be used to estimate cell coverage and optimize cell allocation to various locations. The data may further include core network data 315 (e.g., the data collected by a 5G core network) such as data generated in anomaly detection, packet forwarding, customer authentication and charging.

The data may include weather data 316 and other geographic and spatial data 318. Weather conditions like humidity and temperatures affects the network performance of a fixed wireless network. Additionally, geographic data, including (1) data about man-made structures (e.g., buildings of various types) within an area in which a fixed wireless network is deployed and (2) data about terrain of the area, has a significant impact on the network performance of a fixed wireless network. The data about man-made structures is often referred to as synthetic conditions, which include data on the materials of the man-made structures, and these data may be retrieved from public and proprietary sources.

One observation is that weather and other geographic and spatial data often have a certain uniformity across a defined area such as an area covered by a zip code (a unique code for mail delivery covering a geographic region), a census tract (a geographic region defined for the purpose of taking a census), or a city. Additionally, uniformity across smaller locality such as a cell site, a street, or a cell coverage area may be used to monitor/predict the performance of a fixed wireless network. In other words, considering the weather and other geographic and spatial data within an area (spatial locality) can make the network performance prediction more accurate. Additionally, the same season/month in different years at a given locale often has similar environmental conditions, and considering the environmental condition regarding the season/month (referred to as seasonality or temporal locality) also may make the network performance prediction more accurate, and they may also be gathered for network performance prediction.

The data from the data source 202 are made available to ingestion component 304, which may take the data through batch ingestion (e.g., for historical data) at 324 and/or streaming ingestion (e.g., for new incoming records through VNF event stream 132) at 326 as discussed herein above. The collected data may also be processed at processing component 306, and the data processing is discussed herein above relating to FIG. 2 and is not repeated here.

The processed data are then used to predict network performance by applying numerous prediction models, and machine learning may be used to train, update, and use the prediction models. The machine learning uses hyperparameter tuning at reference 332.

In machine learning, a hyperparameter is a parameter whose value is set before the learning process begins. By contrast, the values of other parameters are derived via training. The time required to train and test a model may depend on the choice of its hyperparameters. A value of a hyperparameter may be a floating-point value or an integer, and hyperparameter optimization finds tuple of hyperparameters that yields an optimal model which minimizes predefined errors on given test data. The hyperparameters may be provided by an operator of a fixed wireless network. In one embodiment, the hyperparameters includes values indicating prediction speed and accuracy. These hyperparameters may be set by the operator based on the user preference.

One may assume generally that (1) the longer the duration between re-calibration of a model and (2) the lower the amount of data taken for the prediction, the faster is the prediction but the lower the accuracy. Inversely, (1) the shorter the duration between re-calibration of the model and (2) the higher the amount of data taken for the prediction, the slower is the prediction but the higher the accuracy of the prediction. A few examples may illustrate the compromise.

The time between re-calibration may be represented as a hyperparameter $x_f$, the amount of data $x_a$ (measured in percentage), the weightage for duration (reflecting speed) as a hyperparameter $\omega_s$, and a weightage for accuracy as a hyperparameter $\omega_a=(1-\omega_s)$. One may set duration weightage in the range of [0.7, 1) as the range of long duration (a longer duration between re-calibration), (0.3, 07) as moderate speed, and (0.1, 0.3] as low speed. The time between re-calibration may be updated using the following:

$$x'_f=(\omega s)*x_f$$

And $$x'_a=(1-\omega s)*x_a$$

Thus, for a prediction model with a long duration weightage of $\omega_s=0.7$, and the initial re-calibration time $x_f=600$ seconds (10 minutes), and available data $x_a=100\%$ (all existing data), the time between re-calibration is $$x'_f=(\omega s)*x_f=0.7*600=420$$

which is a long duration and the amount of data taken for the prediction is $$x'_a=(1-\omega s)*x_a=(1-0.7)*100=30\%$$

Which is a low data consumption.

In the contrary, for a prediction model with a short duration weightage of weightage of $\omega_s=0.3$, with the same other initial parameter values, the time between re-calibration is $$x'_f=(\omega s)*x_f=0.3*600=180$$

which is a short duration, and the amount of data taken for the prediction is $$x'_a=(1-\omega s)*x_a=(1-0.3)*100=70\%$$

Which is a high data consumption.

Between the two ends is the medium duration and data consumption. For example, for a prediction model with a medium duration weightage of weightage of $\omega_s=0.5$, with the same other initial parameter values, the time between re-calibration is $$x'_f=(\omega s)*x_f=0.5*600=300,$$

and the amount of data taken for the prediction is $$x'_a=(1-\omega s)*x_a=(1-0.5)*100=50\%$$

An operator may adjust the values of the hyperparameters to control the selection of the models. The hyperparameter may be optimized through grid search, random search, Bayesian optimization, gradient-based optimization, and/or evolutionary optimization. For example, the grid search may search exhaustively through a specified subset of the hyperparameter space of a learning algorithm. The grid search may be guided by a performance metric, typically measured by cross-validation on the training set or evaluation of a held-out validation set.

Uni-Variate Prediction

Once the hyperparameters are tuned at hyperparameter tuning 332, an array of models may be built at reference 334 to predict network performance. The network performance prediction may use univariate prediction, where a single variable is used to predict the network performance A network performance may be measured in a variety of ways. For example, the network performance may be measured in traffic throughput. For example, one may measure the network performance in terms of throughput at the application layer (Layer 7 in the Open Systems Interconnection (OSI) model), network layer (Layer 3) or data link layer (Layer 2). The network performance may be measured using signal strength or other physical layer (Layer 1) parameters. For example, the network performance may be measured in signal-to-noise ratio (SNR), block error rate (BLER), bit error rate (BER), delay, or jitter.

With uni-variate prediction, the analysis component 308 takes data of one type, and make prediction of the network performance measured in the same data type. For example, to predict network performance measured in throughput (bits/second), the analysis component 308 takes throughput data from various sources and makes the prediction. The prediction is based on hyperparameter tuning, it uses an array of models. The main motivation is to build models that could perform fast prediction where data shows stable trends as compared to places where we see a lot of variability and trend. This speed and model complexity trade-off helps the platform to build models fast for simple datasets and build complex models for complex datasets with a lot of seasonality and trend.

One model is simple moving average (SMA). SMA is particularly useful in situations where the throughput is increasing and decreasing randomly by a small margin, such that the average remains constant. Often, we are provided with a dataset, in which the sharp increase/decrease occurs some time periods ago. In such a case we can forecast the throughput for the next 15 minutes based on the moving window average. Such a forecasting technique which forecasts the expected value equal to the average of all previously observed points in a certain sliding window is called Simple Moving Average technique, which may be expressed mathematically as the following:

$$\hat{y}_t = \frac{1}{p}(y_{i-1} + y_{i-2} + y_{i-3} \ldots + y_{i-p})$$

We take all the values previously known, to calculate the average and take it as the next value. As a forecasting method, it applies well to situation where there are few sharp increases or decreases in the data. The simple moving average may be revised to add weights on values within the moving window, for example, the value at more recent time may be given more weight while values more remote may be given less weight, and the revised moving average method is called weighted moving average (WMA) method.

Another model is Holt Linear Method (HLM). SMA does not take the trend of the data into consideration. Trend is a general pattern of increase or decrease of throughput over time. Holt extended simple exponential smoothing to allow forecasting of data with a trend. It is nothing more than exponential smoothing applied to both level (the average value in the series) and trend. To express this in mathematical notation we now need three equations: one for level, one for the trend and one to combine the level and trend to get the expected forecast ŷ:

Forecast equation: $\hat{y}_{t+h|t} = \ell_t + hb_t$

Level equation: $\ell_t = \alpha y_t + (1-\alpha)(\ell_{t-1} + b_{t-1})$

Trend equation: $b_t = \beta^*(\ell_t - \ell_{t-1}) + (1-\beta)b_{t-1}$

The values predicted in the above method are called Level. In the above three equations, level and trend are added to generate the forecast equation. As with simple exponential smoothing, the level equation shows that it is a weighted average of observation and the within-sample one-step-ahead forecast. The trend equation shows that it is a weighted average of the estimated trend at time t based on ℓ(t)− ℓ(t−1) and b(t−1), the previous estimate of the trend (the Holt Linear Method is thus a weighted average method).

Additionally, the method uses a multiplicative seasonality for the data. The advantage of this technique is that it takes the trend into consideration apart from the simple moving average and this could perform faster than other complex models and have for certain time interval in the data collected where there was an increasing trend.

Yet another model is Holt Winters Method (HWM). In addition to datasets apart from the trend, there is also seasonality involved in the data. These datasets require a bit more complex algorithm. The Holt Winters Method, also known as triple exponential smoothing (or Holt Winters filtering), takes seasonality into consideration. It may be used to forecast data points in a series, provided that the series is "seasonal," i.e. repetitive over some period. The Holt Winters Method comprises the forecast equation and three smoothing equations—one for the level $\ell t$, one for trend $b_t$, and one for the seasonal component denoted by $S_t$, with smoothing parameters $\alpha$, $\beta$ and $\gamma$, and may be expressed as the following:

level $L_t = \alpha(y_t - S_{t-s}) + (1-\alpha)(L_{t-1} + b_{t-1})$;

trend $b_t = \beta(L_t - L_{t-1}) + (1-\beta)b_{t-1}$, seasonal $S_t = \gamma(y_t - L_t) + (1-\gamma)S_{t-s}$ forecast $F_{t+k} = L_t + kb_t + S_{t+k-s}$, Where s is the length of the seasonal cycle, for $0 \le \alpha \le 1$, $0 \le \beta \le 1$ and $0 \le \gamma \le 1$.

The level equation shows a weighted average between the seasonally adjusted observation and the non-seasonal forecast for time t. The trend equation is identical to the Holt Linear Method. The seasonal equation shows a weighted average between the current seasonal index, and the seasonal index of the same season last year (i.e., S time periods ago).

A further model for uni-variate prediction is autoregressive integrated moving average (ARIMA) method with seasonality component included in it, referred to as seasonal ARIMA (SARIMA). ARIMA method aims to describe the correlations in the data with each other.

Three distinct integers (p, d, q) are used to parametrize an ARIMA model (also referred to as Box-Jenkins model), thus an ARIMA model may be denoted with the notation ARIMA (p, d, q). Together these three parameters account for seasonality, trend, and noise in datasets. Parameter p is the auto-regressive part of the model. It incorporates the effect of past values into the model. It makes the prediction model better—for example, it is likely to be warm tomorrow if it has been warm in the past 3 days. Parameter d is the integrated part of the model. This includes terms in the model that incorporate the amount of differencing (i.e. the number of past time points to subtract from the current value) to apply to the time series. Intuitively, this would be similar to stating that it is likely to be same temperature tomorrow if the difference in temperature in the last three days has been very small Parameter q is the moving average part of the model. This allows the model to set the error of the model as a linear combination of the error values observed at previous time points in the past (the ARIMA method is thus based on lagging data values).

Using these models for uni-variate prediction, the analysis component 308 may build an array of models serially or parallelly at reference 334. Each model is one of the simple moving average, Holt Linear Method, Holt Winters Method, and ARIMA method.

Multi-Variate Prediction

While uni-variate prediction takes one type of data and make prediction of the network performance measured in the same data type, multi-variate prediction may take a plurality of data types and make prediction of the network performance in one data type. For example, to predict network performance measured in throughput (bits/second), the analysis component 308 may take weather data 316, geographic spatial data 318, customer data 312, and other data type from data sources 202 to predict the throughput. When multi-variate prediction is applied, automatic feature selection 342 selects the data types used for the multi-variate prediction.

The automatic feature selection 342 may specify best K data types for the network performance prediction. The best K data types are the ones that have the highest values for default scoring function, e.g., using analysis of variance (ANOVA) F-test. In alternative, the best data types (also referred to as features or influencers) may be selected based on a percentile, which is similar to the K Best methodology but uses the percentile instead of a fixed number of features.

The data of the selected data types are then provided to the hyperparameter tuning 344, which operates similarly as the hyperparameter tuning 332. Once the hyperparameters are tuned, the arrays of models are applied for the multi-variate predictions.

With multiple types of data are used for the network performance prediction, a few more models may be used. One is multi-variate linear regression (MLR). The MLR uses multiple explanatory variables (independent variables) for the model building process. It starts with first splitting the initial dataset into train and validation sets. The model building process is done on the dataset using a logistic regression model. The model uses logging data values of the independent variables to perform the prediction.

Another model is autoregressive integrated moving average model being extended through the inclusion of an external variable X, and it is referred to as ARIMAX model (also referred to as Box-Tiao model). The external variable may be one of signal to nose ratio (SNR), block error rate (BLER), bit error rate (BER), delay, or jitter. An ARIMAX (p, d, q) model for a time series data $y_t$ and external data $X_t$ may be expressed as the following (where p is the number of autoregressive lags, D is the degree of differencing and q is the number of moving average lags):

$$\Delta^D y_t = \sum_{i=1}^{p} \phi_i \Delta^D y_{i-1} + \sum_{j=1}^{q} \theta_j \varepsilon_{t-j} + \sum_{m=1}^{M} \beta_m Xm, t + \varepsilon_t$$

$$\varepsilon_t \sim N(0, \sigma^2)$$

These additional models for multi-variate predictions put additional data types into consideration thus more models are used at reference 334. The models from uni-variate and multi-variate predictions are used to predict network performance, and the best models are selected at reference 336. The selection may be based on an error measurement. For example, the error measurement may be root-mean-square deviation (RMSD) or root-mean-square error (RMSE). Then the selected best model replaces an existing model at the old model replacement and new model deployment 338. The new model is used to predict the network performance, and its errors are monitored real-time, and the error rate is tracking using a score at model scoring 340. When the model scoring is below a threshold level, the model is re-calibrated at reference 352. For example, an initial threshold may be set to 75%, and when the accuracy measured by the error measurement (e.g., RMSD/RMSE) falls below the threshold, the error is determined to be too large, and the automatic re-calibration is triggered. The re-calibration may include changing parameters of the model, or changing to a new model (e.g., from MLR to ARIMAX).

Results from Exemplary Deployment

The network performance prediction methods and data flow have been applied to fixed wireless networks. Exemplary deployment snapshots are discussed herein. FIG. 4A shows the multi-variate selection for network performance prediction per one embodiment of the invention. The automatic feature selection 342 selects five data types for the network performance prediction, and these data (influencers) are uplink quality, signal strength, signal quality, channel quality, and error rate as shown at reference 402. The data are input to the hyperparameter tuning 344, and different models (e.g., SMA, HLM, HWM, ARIMA, MLR, and ARIMAX) are then built at reference 334. For each data type, an expected value and allowed deviation is set as shown at reference 404. The expected values and allowed deviation are the benchmarks to predict the network performance.

For example, for uplink quality, the expected value is 8.047 and its allowed deviation is 1.143. In one embodiment, the expect value is the average over time (may considering seasonality, trend, and other factors), and if a measured uplink quality value is within the allowed deviation of the expected value, the data is expected to contribute to a good throughput prediction. If the measured uplink quality is outside of the deviation often or deviates significant, it may indicate that the network performance will deteriorate in the near future, and remedial measures need to be taken.

FIG. 4B shows a network performance prediction per one embodiment of the invention. The network performance value to be predicted is a throughput in Mbps (e.g., at the OSI Network Layer). The dashed line shows the measured throughput in every 15 minutes (each bar is a throughput value in a 15-minute duration) until a current moment, and the solid line is the predicted throughput in the future as shown at reference 450. The bottom is the result of the model scoring 340, which gives full score of 100 for a perfect prediction (no error from a measured throughput at a moment and earlier prediction for the moment), and the lower score as the further a prediction deviates from a later measurement.

In the FIG. 4B, the predicted throughput degradation is shown at reference 455. Note that the measured throughput values lag the predicted throughput values in the last several time durations. The predicted throughput dropped significantly in the time period and indicates a likely throughput degradation that may require the operator's attention. During the time period, the accuracy score suffers too, as the earlier part of the period shows the big gap between the measured and predicted throughput. With the visualization of the prediction versus measurement of the throughput, the operator may act proactively and determine if any remedial operations are necessary.

Figure 4C:
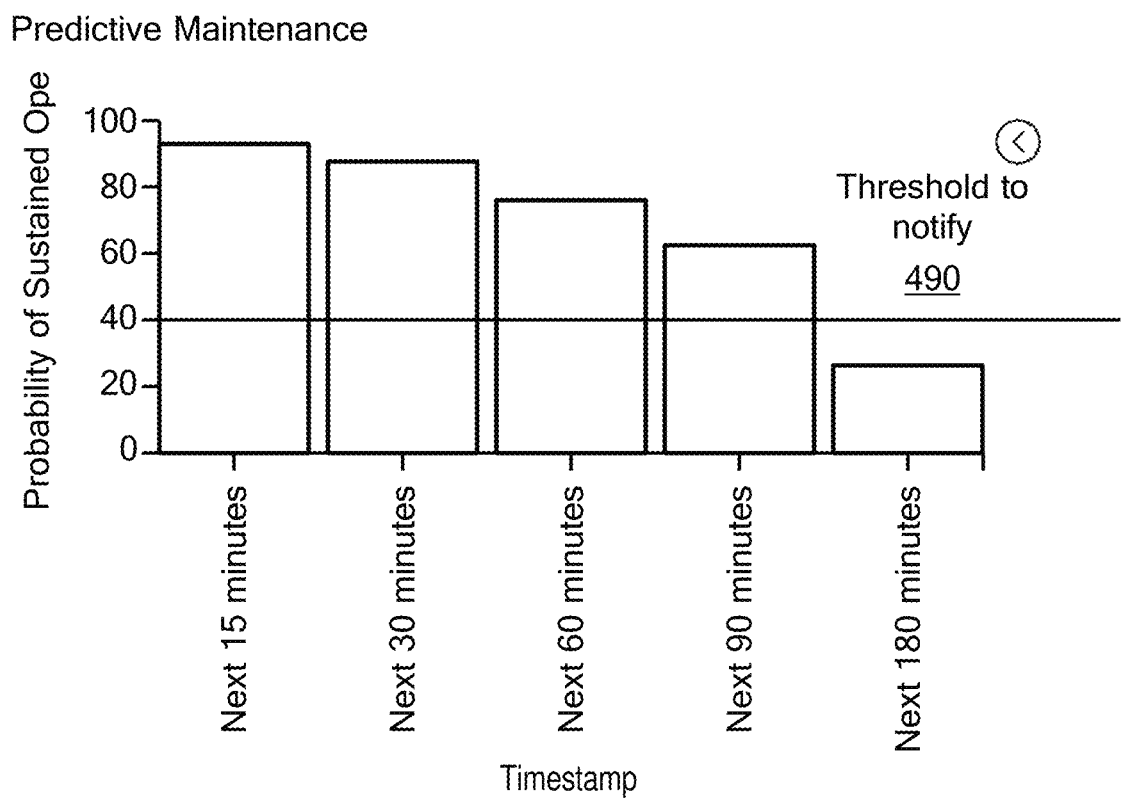
FIG. 4C shows preventive maintenance per one embodiment of the invention.

FIG. 4C shows preventive maintenance per one embodiment of the invention. While the prediction in the immediate future (e.g., the next 15 to 60 minutes in FIG. 4B) is useful, a longer-term prediction to forecast network performance several hours later is also advantageous. In FIG. 4C, the throughput is forecasted in terms of percentage of an expected throughput in the next three hours. The threshold to notify the operator about the degradation of the throughput is that the predicted throughput is below 40% of the expected throughput as shown at reference 490. When that happens, the network performance prediction system notifies the operator so that the operator may perform remedial operations. Such preventive maintenance is important as a major problem facing a network operator is to reactively fix any problems that may have occurred in a fixed wireless network. This incurs a heavy cost since the client may lose some business value because of the delay between time of incident and the time taken to take the corrective steps. By forecasting the network performance degradation several hours earlier, the operator may prevent the network performance from being actually degraded by mitigation, e.g., assign a different cell to communicate with a CPE at a location, using different resource elements (see FIG. 9A-B) to communicate with the CPE.

Figures 5A, 5B:
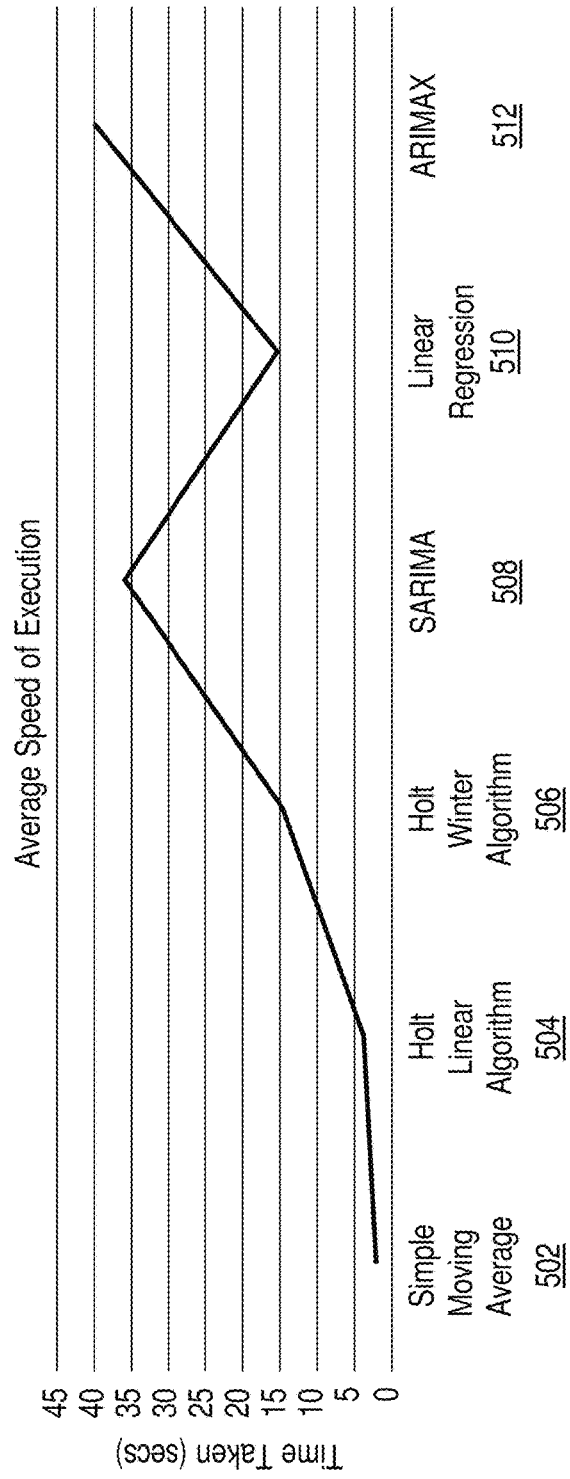
FIGS. 5A-B show convergence measurements of prediction models per embodiments of the invention.

Different prediction models have different speeds in arriving at their predictions, i.e., the convergence time varies among the prediction models. FIGS. 5A-B show convergence measurements of prediction models per embodiments of the invention. The convergence time of six models are shown in FIG. 5A, and the simple moving average 502 has the shortest convergence time, and the convergence time increases from Holt Linear Method 504, to Holt Winters Method 506, and to SARIMA 508. The convergence time for MLR 510 is less than SARIMA, and the convergence time for ARIMAX is highest in the six models.

FIG. 5B shows the actual data values and the types of prediction models (uni-variate vs. multi-variate). Training data are fed to different prediction models, and the accuracy of the prediction of the various prediction models are recorded. Note that the convergence time may vary depending on implementation and the relative convergence time may depend on the tuning of parameters, and the simpler the model, the quick is the convergence time. The SMA takes around two seconds at one end, while the ARIMAX and Gradient Boosting model takes around 30 seconds at the other end. Yet the accuracy of the simpler models is lower. For example, because SMA fails to consider trend, the accuracy is only 56% when data considering variation of the trend are included; and the accuracy drops to 32% when data considering both trend and seasonality are included.

Based on the user preference indicated using weightage for duration and accuracy, the suitable models may be selected in different scenarios. Table 1 shows a selection of model based on user preference per one embodiment.

|  | High Speed (0.7 <= $w_s$ < 1.0) | Lower Speed (0.1 <= $w_s$ <= 0.3) | Moderate Speed (0.3 < $w_s$ < 0.7) |
| --- | --- | --- | --- |
| Lower Accuracy Acceptable | Simple Moving Average (SMA) | — | Weighted Moving Average (WMA) |
| Moderate Accuracy Acceptable | Holt Linear Method (HLM) | Holt Winters Method (HWM) | Linear Regression |
| Expect only Higher Accuracy | — | ARIMAX | SARIMA |

Operations to Predict Network Performance Per Some Embodiments

Figure 6A:
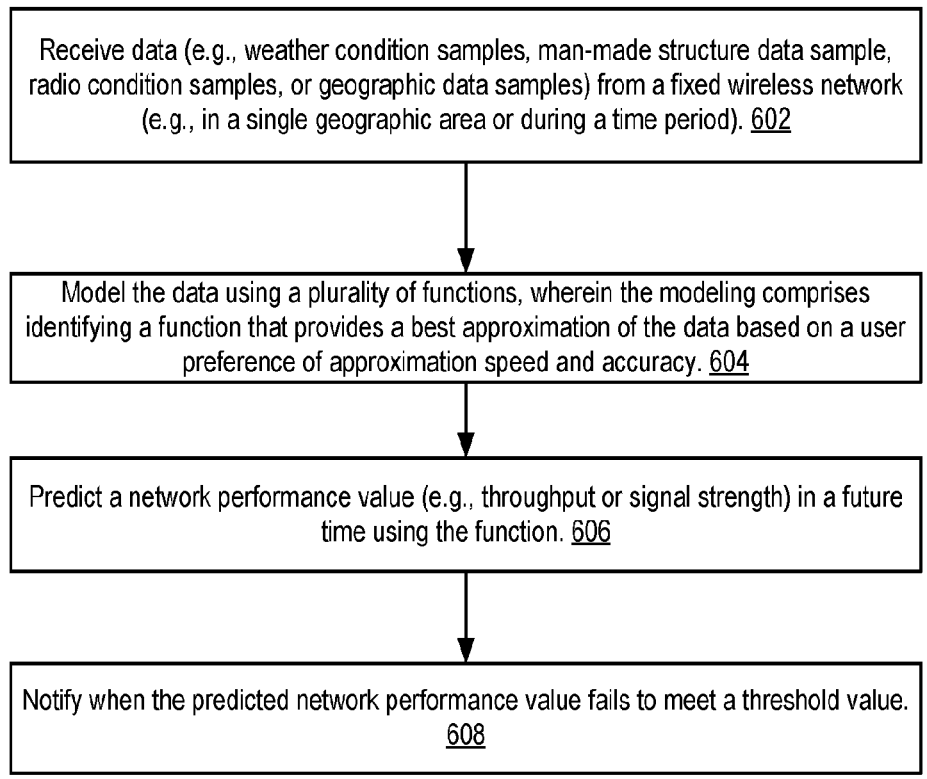
FIG. 6A is a flow diagram showing the operations to predict network performance per some embodiments of the invention.

FIG. 6A is a flow diagram showing the operations to predict network performance per some embodiments of the invention. Method 600 may be performed by an electronic device in a fixed wireless network. The fixed wireless network includes one or more network devices and terminal devices that are installed at fixed locations.

At reference 602, data of a fixed wireless network is received. The data may be a batch of data through batch ingestion 232 or may be stream of data through stream ingestion 234 as discussed herein above. The data may include one or more of weather condition samples, man-made structure data sample, radio condition samples, or geographic data samples. These data samples are data obtained from data source 202 discussed herein above. The data may be from a single geographic area (e.g., covered by a zip code or a census tract) and/or for a single time duration (e.g., an hour of a day, a day, a week, a month, and/or a season) in one embodiment.

At reference 604, the data are modeled using a plurality of functions, where the modeling comprises identifying a prediction function that provides a best approximation of the batch of data based on a user preference of approximation speed and accuracy. Each of the functions may be a function using a model discussed herein relating to FIG. 3. The user preference may be provided through a Representational state transfer (REST) application programming interface (API). An operator may input the weightage for duration and/or accuracy to indicate the user preference as discussed herein above in one embodiment.

In one embodiment, the plurality of functions includes (1) a function determining a moving average of the data (e.g., the SMA method); (2) a function determining a weighted moving average of the data (e.g., the WMA method); (3) a function determining a trend of the data using exponential smoothing (e.g., the HLM method); (4) a function determining seasonality of the data using Holt Winters filtering (e.g., the HWM method); and (5) a function determining a seasonality of the data based on lagging data values (e.g., a ARIMA method).

In one embodiment, the data comprises a same type of data as that of the network performance value, and thus uni-variate prediction is performed. In one embodiment, the data comprises a plurality of types of data to predict the network performance value, and thus multi-variate prediction is performed. In one embodiment, the plurality of types of data are distinct from that of the network performance value. When the multi-variate prediction is performed, two additional functions may be used: (6) a multi-variate linear regression (MLR) function, where each type of the data is a variable of the MLR function; and (7) an autoregressive integrated moving average (ARIMAX) function with an external variable, where each type of the data is a variable of the ARIMAX function.

At reference 606, a network performance value in a future time is predicted using the prediction function, and at reference 608, a notification is sent when the predicted network performance value fails to meet a threshold value. The network performance value may be value for traffic throughput, or a value for signal strength as discussed herein above. In one embodiment, the notification uses a REST API. The notification may be a visual representation and/or audio message/alert in one embodiment. The threshold value may be a determined value for the traffic throughput or signal strength (e.g., 40% of throughput in FIG. 4C).

Figure 6B:
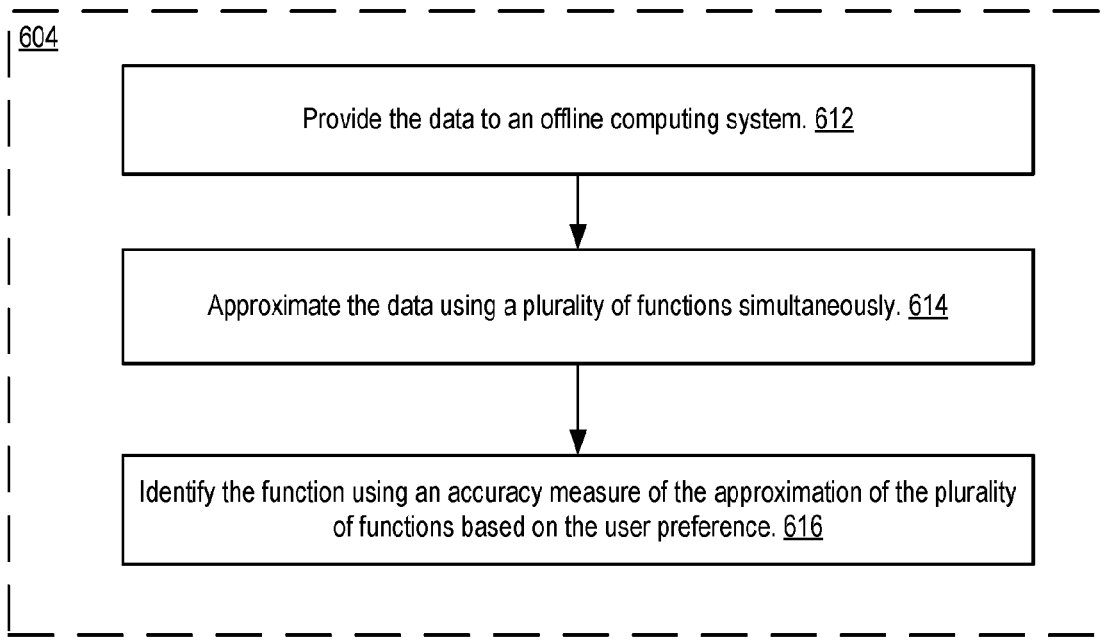
FIG. 6B is a flow diagram showing identification of the prediction function to predict network performance per some embodiments of the invention.

FIG. 6B is a flow diagram showing identification of the prediction function to predict network performance per some embodiments of the invention. The operations of method 650 may be an embodiment of operations within reference 604 in one embodiment.

At reference 612, the data (e.g., collected data from data sources 202 and may be processed by data processing stage 264) are provided to an offline computing system. The offline computing system may be a commercial cloud computing platform (e.g., Amazon Web Services, Google Cloud Platform, Microsoft Azure, IBM Bluemix, and Alibaba Cloud) or a proprietary offline computing system that is physically separated from the electronic device making the network performance prediction. The offline computing system may offer more computing resources than the electronic device may come to bear.

At reference 614, the data are approximated using the plurality of functions simultaneously. The approximation is one embodiment of the operations of building the array of models at reference 334. At reference 616, the function is identified using an accuracy measure of the approximation of the plurality of functions based on the user preference.

The identification is one embodiment of the operations of automatic selection of the best model at reference 336.

Through embodiments of the invention, multiple prediction models may be applied to prediction network performance in parallel; an operator may select the best model for the approximation based on the operator's preference of speed and/or accuracy; the REST API provide interfaces for the operator to provide input (e.g., by assigning weightage) and also made the prediction results readily available; the selecting and training of the models may be automatic based on feedback; and data types that impacts the prediction may be benchmarked. The automatic network performance prediction methods thus offer advantages over prior approaches.

An Electronic Device Implementing Embodiments of the Invention

Figure 7:
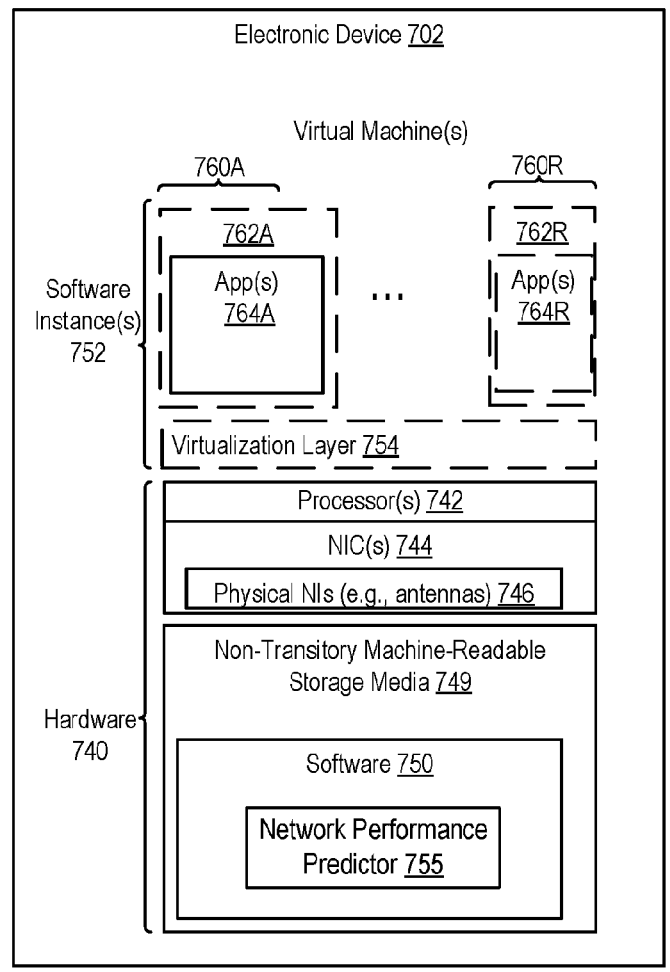
FIG. 7 shows an electronic device implementing prediction of network performance per one embodiment of the invention.

FIG. 7 shows an electronic device implementing the network performance prediction per one embodiment of the invention. The electronic device 702 may be implemented using custom application-specific integrated-circuits (ASICs) as processors and a special-purpose operating system (OS), or common off-the-shelf (COTS) processors and a standard OS.

The electronic device 702 includes hardware 740 comprising a set of one or more processors 742 (which are typically COTS processors or processor cores or ASICs) and physical NIs 746, as well as non-transitory machine-readable storage media 749 having stored therein software 750. During operation, the one or more processors 742 may execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment, the virtualization layer 754 represents a hypervisor (sometimes referred to as a virtual machine monitor (VMM)) or a hypervisor executing on top of a host operating system, and each of the sets of applications 764A-R run on top of a guest operating system within an instance 762A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The software 750 contains a network performance predictor 755 that performs operations described with reference to FIGS. 1-6. The network performance predictor 755 may be instantiated within the applications 764A-R. The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual electronic device 760A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address).

A Fixed Wireless Network in Accordance with Some Embodiments

Figure 8:
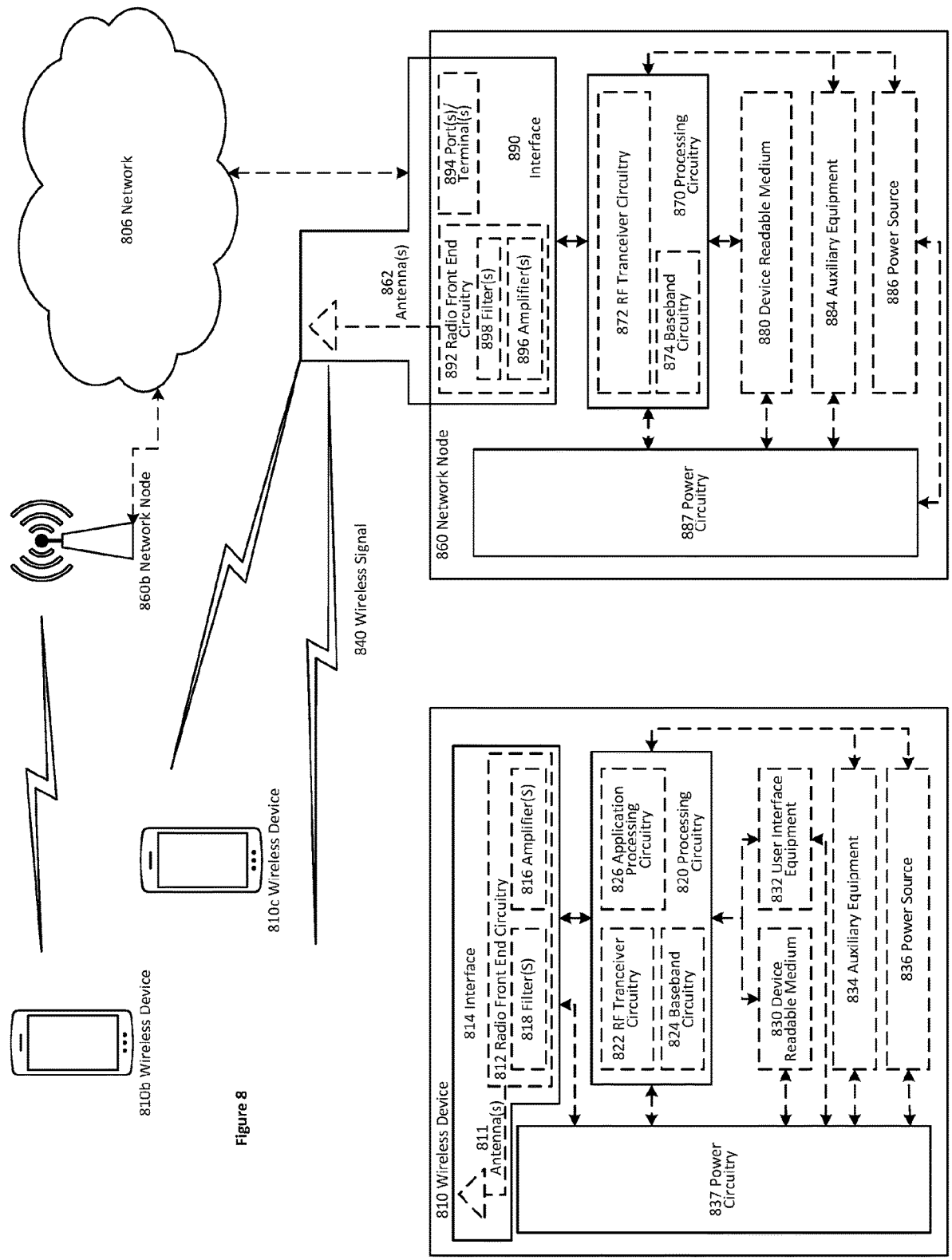
FIG. 8 shows a wireless network per one embodiment of the invention.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 861 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network. In one embodiment, one or more of the network nodes 861 and 860*b*, WDs 810, 810*b*, and 810*c* are installed in fixed location thus the wireless network operates as a fixed wireless network.

The wireless network 806 may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node, similar to network device discussed herein above, refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SoC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 674 may be on separate chips (or sets of chips), boards, or units, such as radio units and digital units. In alternative embodiments, part or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 694, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 892 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 686. Power source 686 and/or power circuitry 887 may be configured to provide power to the various components of network node 860 in a form suitable for the respective components (e.g., at a voltage and current level needed for each respective component). Power source 686 may either be included in, or external to, power circuitry 887 and/or network node 860.

For example, network node 860 may be connectable to an external power source (e.g., an electricity outlet) via an input circuitry or interface such as an electrical cable, whereby the external power source supplies power to power circuitry 887. As a further example, power source 686 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 620 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 812 is connected to antenna 811 and processing circuitry 820, and is configured to condition signals communicated between antenna 811 and processing circuitry 620. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SoC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Radio Resources Used in a Wireless Network

Figure 9A:
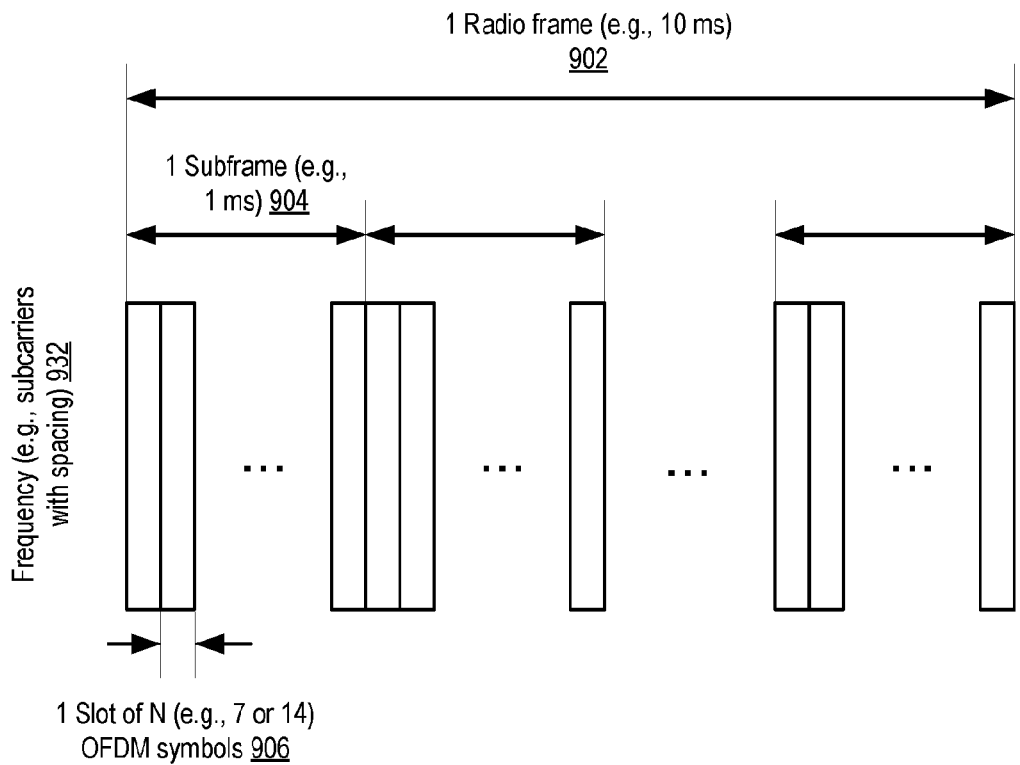
FIG. 9A shows an exemplary signal transmission hierarchy in a wireless network.

When an operator is in need of taking remedial measures to mitigate a predicted network performance deterioration, the operator may adjust radio resource allocation. The radio resources may be allocated and adjusted are discussed in more details herein. FIG. 9A shows an exemplary signal transmission hierarchy in a wireless network. The exemplary signal transmission hierarchy includes the transmission unit of frame such as radio frame 902. A radio frame 902 takes ten milliseconds to transmit in one embodiment. The frame may contain a number of subframes such as subframe 904. In this example, the radio frame 902 contains ten subframes, each takes one millisecond. Each subframe may contain a number of slots. For example, a subframe may contain two slots. Each slot such as the slot at reference 906 may contain a number of symbols. In one example, a slot contains either 7 or 14 symbols. The symbol is an orthogonal frequency-division multiplexing (OFDM) symbol in one embodiment.

The frame—subframe—slot—symbol hierarchy is an example of time domain hierarchy. In the frequency domain (as illustrated at reference 932), each symbol may be transmitted over a number of subcarriers. A symbol may be transmitted using a number of resource block (RB), each of which may contain 12 subcarriers in one embodiment. In one embodiment, each subcarrier includes a bandwidth (e.g., 7.5 kHz or 15 kHz) for transmission. One subcarrier x one symbol may be referred to as a resource element (RE), which is the smallest unit of resource to be allocated for signal transmission in one embodiment.

The illustrated frame structure offers an example for signal transmission. In this frame structure or other frame structures, data and signaling transmission is performed at a lowest level of time unit (symbol level in this case), which is included in a time unit (slot level in this example) a level over the lowest level of time unit in one embodiment. Data and signaling for one transmission from a source network device to a destination network device often use the same position within the signal transmission hierarchy, e.g., the same symbol position in consecutive slots (e.g., symbol #2 of each slot) or subframes, or in alternating slots (e.g., symbol #2 in every other slot) or subframes.

Figure 9B:
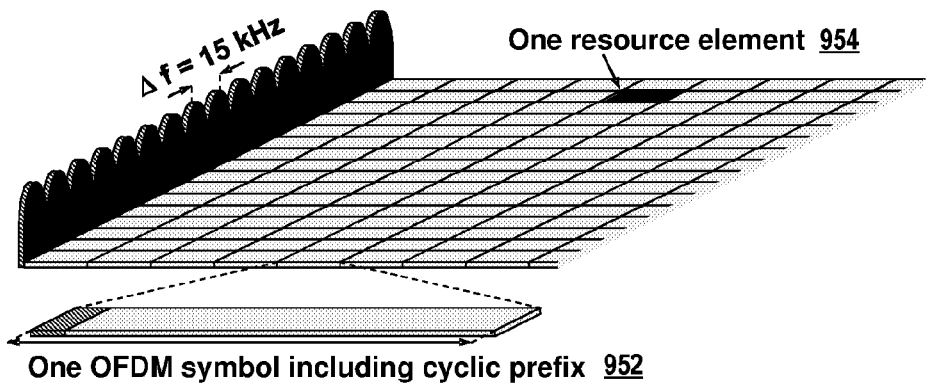
FIG. 9B shows resource elements used for data and signaling transmission.

FIG. 9B shows resource elements used for data and signaling transmission. The physical resources for transmission may be view as time and frequency grids as illustrated, where each resource element occupies a time period in the time domain and a frequency range in the frequency domain Each OFDM symbol includes a cyclic prefix as illustrated at reference 952. Each OFDM symbol utilizes a number of resource elements. In this example, the subcarrier spacing is 15 k Hz, and the resource element (RE) 952 occupies an orthogonal frequency-division multiplexing (OFDM) subcarriers within an OFDM symbol. A network device may allocate some resource elements for a particular type of signaling. Such allocation may be specified through identifying the time period in the time domain and the frequency range in the frequency domain in a signal transmission hierarchy; or it may be specified through identifying specific resource elements within the signal transmission hierarchy.

For downlink control, a wireless network may use PDCCHs (physical downlink control channels) to transmit downlink control information (DCI), which provides downlink scheduling assignments and uplink scheduling grants. The PDCCHs are in general transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e. different code rate for a given payload size). A UE is configured (implicitly and/or explicitly) to blindly monitor (or search) for a number of PDCCH candidates of different aggregation levels and DCI payload sizes. Upon detecting a valid DCI message (i.e. the decoding of a candidate is successful, and the DCI contains a ID the UE is told to monitor) the UE follows the DCI (e.g. receives the corresponding downlink data or transmits in the uplink). The blind decoding process comes at a cost in complexity in the UE but is required to provide flexible scheduling and handling of different DCI payload sizes.

Virtualization Environment in Accordance with Some Embodiments

Figure 10:
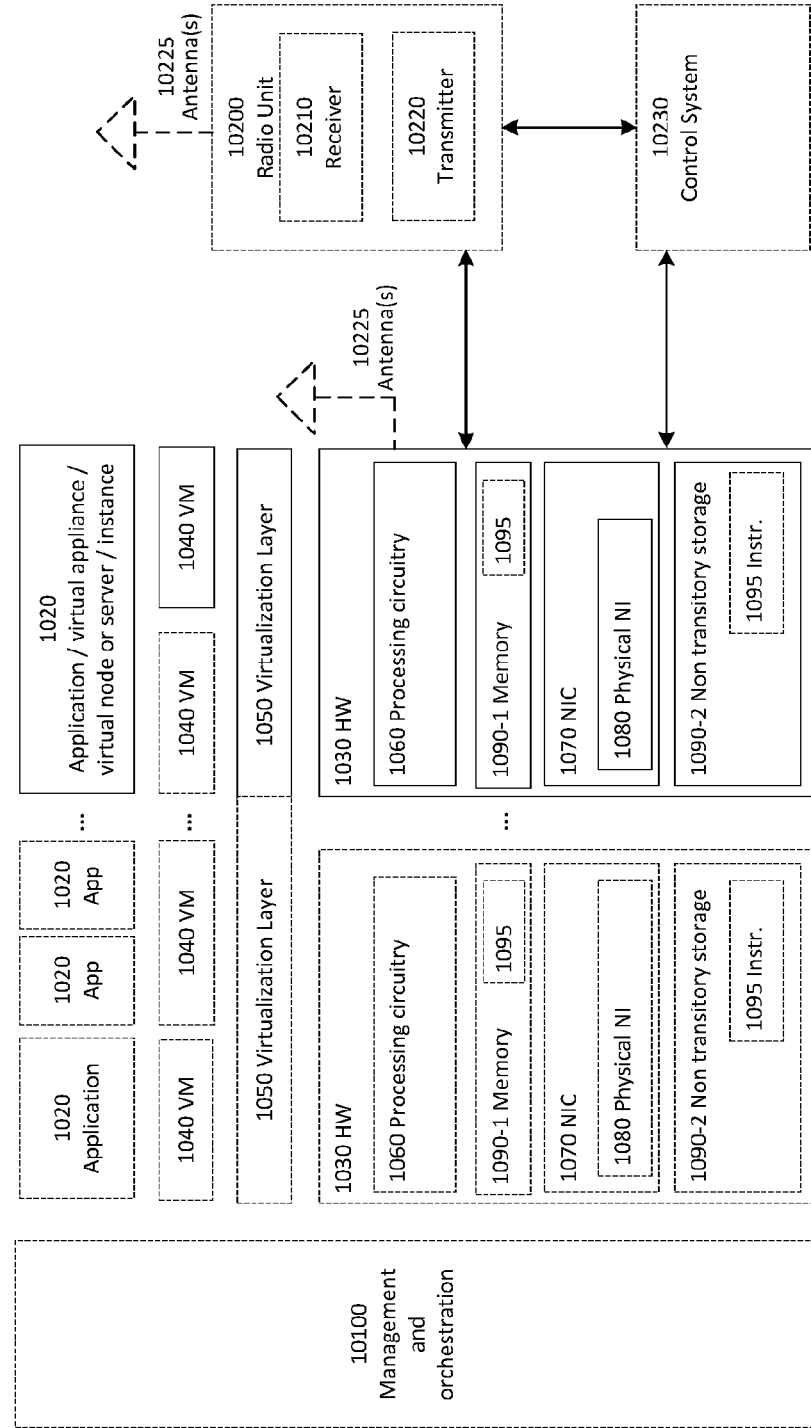
FIG. 10 shows a virtualization environment per one embodiment of the invention.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be effected with the use of control system 8230 which may alternatively be used for communication between the hardware nodes 1030 and radio units 10200.

Figure 11:
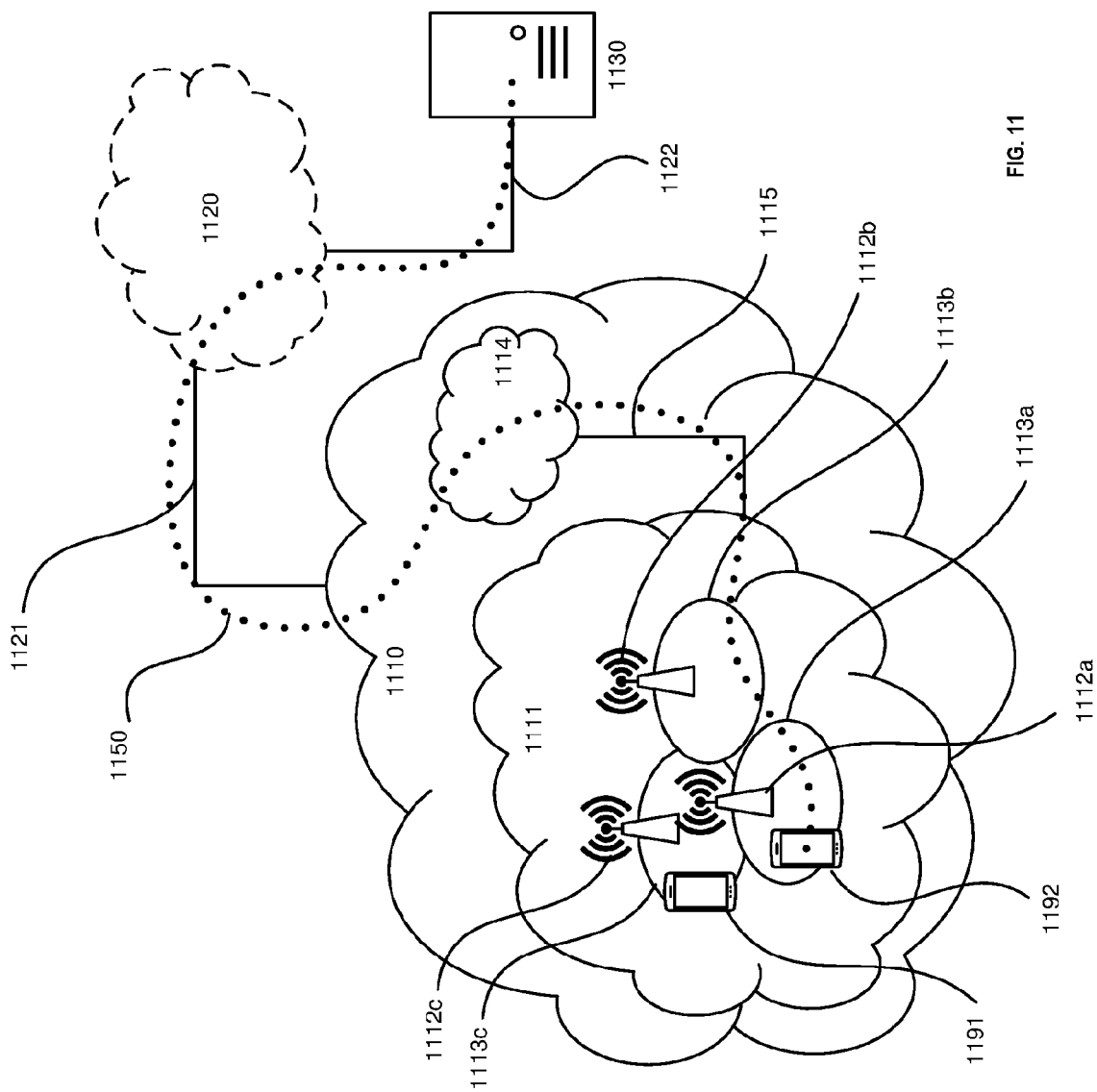
FIG. 11 shows a telecommunication network connected via an intermediate network to a host computer per one embodiment of the invention.

Telecommunication Network Connected Via an Intermediate Network to a Host Computer in Accordance with Some Embodiments With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Some of the embodiments contemplated herein above are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method performed by an electronic device to predict network performance of a fixed wireless network, the method comprising:
   receiving data of the fixed wireless network, the data including one or more of weather condition samples, man-made structure data sample, or geographic data samples;
   modeling the data using a plurality of functions, the modeling comprises:
      identifying a prediction function that provides a best approximation of the data based on a user preference of approximation speed and accuracy;
   predicting a network performance value in a future time using the prediction function, the network performance value being a value for signal strength; and
   notifying when the predicted network performance value fails to meet a threshold value.

2. The method of claim 1, wherein the data comprises data from a single geographic area or from a single time duration.

3. The method of claim 1, wherein identifying the prediction function that provides the best approximation of the data comprises:
   providing the data to an offline computing system;
   approximating the data using the plurality of functions simultaneously; and
   identifying the prediction function using an accuracy measure of the approximation of the plurality of functions based on the user preference.

4. The method of claim 1, wherein the plurality of functions comprises:
   a function determining a moving average of the data;
   a function determining a weighted moving average of the data;
   a function determining a trend of the data using exponential smoothing;
   a function determining seasonality of the data using Holt Winters filtering; and
   a function determining a seasonality of the data based on lagging data values.

5. The method of claim 1, wherein the data comprises a same type of data as that of the network performance value.

6. The method of claim 1, wherein the data comprises a plurality of types of data to predict the network performance value.

7. The method of claim 6, wherein the plurality of functions comprises:
   a multi-variate linear regression (MLR) function, wherein each type of the data is a variable of the MLR function; and
   an autoregressive integrated moving average function with an external factor (ARIMAX), wherein each type of the data is a variable of the ARIMAX function.

8. The method of claim 1, wherein the notifying comprises using a Representational state transfer (REST) application programming interface (API).

9. The method of claim 1, wherein the user preference of approximation speed and accuracy is provided through a Representational state transfer (REST) application programming interface (API).

10. An electronic device to be deployed in a fixed wireless network, comprising:
    a processor and computer-readable storage medium that provides instructions that, when executed by the processor, cause the electronic device to perform:
       receiving data of the fixed wireless network, the data including one or more of weather condition samples, man-made structure data sample, or geographic data samples;
       modeling the data using a plurality of functions, the modeling comprises: identifying a prediction function that provides a best approximation of the data based on a user preference of approximation speed and accuracy;
       predicting a network performance value in a future time using the prediction function, the network performance value being a value for signal strength; and
       notifying when the predicted network performance value fails to meet a threshold value.

11. The electronic device of claim 10, wherein the identification of the prediction function is to perform:
    providing the data to an offline computing system;
    approximating the data using the plurality of functions simultaneously; and
    identifying the prediction function using an accuracy measure of the approximation of the plurality of functions based on the user preference.

12. The electronic device of claim 10, wherein the data comprises a plurality of types of data that are distinct from that of the network performance value.

13. A non-transitory computer-readable storage medium that provides instructions that, when executed by a processor of an electronic device, cause the electronic device to perform:
    receiving data of a fixed wireless network, the data including one or more of weather condition samples, man-made structure data sample, or geographic data samples;
    modeling the data using a plurality of functions, the modeling comprises: identifying a prediction function that provides a best approximation of the data based on a user preference of approximation speed and accuracy;
    predicting a network performance value in a future time using the prediction function, the network performance value being a value for signal strength; and
    notifying when the predicted network performance value fails to meet a threshold value.

14. The non-transitory computer-readable storage medium of claim 13, where the plurality of functions comprises:
    a function determining a moving average of the data;

a function determining a weighted moving average of the data;

a function determining a trend of the data using exponential smoothing;

a function determining seasonality of the data using Holt Winters filtering; and a function determining a seasonality of the data based on lagging data values.

15. The non-transitory computer-readable storage medium of claim 13, wherein the user preference of approximation speed and accuracy is provided through a Representational state transfer (REST) application programming interface (API).

\* \* \* \* \*